US005896277A

United States Patent [19]
Leon et al.

[11] Patent Number: 5,896,277
[45] Date of Patent: Apr. 20, 1999

[54] SLIDABLE COVER FOR A BATTERY HOUSING

[75] Inventors: Robert Leon, Miami; Glen A. Oross; William H. Robertson, Jr., both of Plantation; Paul A. Lieb, Ft. Lauderdale, all of Fla.

[73] Assignee: Motorola, Inc., Schaumburg, Ill.

[21] Appl. No.: 08/766,600

[22] Filed: Dec. 12, 1996

[51] Int. Cl.⁶ .............................. H04B 1/03; H01M 2/02
[52] U.S. Cl. ........................ 361/814; 455/90; 429/163
[58] Field of Search ........................ 361/726, 814; 455/90, 89; 429/96, 100, 123, 163; 174/52.1; D14/137, 138, 185, 186

[56] References Cited

U.S. PATENT DOCUMENTS

| | | | |
|---|---|---|---|
| 4,858,798 | 8/1989 | Siddoway et al. | 224/242 |
| 5,151,946 | 9/1992 | Martensson | 379/38 |
| 5,230,016 | 7/1993 | Yasuda | 379/58 |
| 5,436,088 | 7/1995 | Castaneda et al. | 429/96 |
| 5,535,434 | 7/1996 | Siddoway et al. | 455/89 |

*Primary Examiner*—Leo P. Picard
*Assistant Examiner*—Jayprakash N. Gandhi
*Attorney, Agent, or Firm*—Frank M. Scutch, III

[57] ABSTRACT

A wraparound battery cover (10) which slidably attaches to the lower portion (24) of a housing (20) is provided. The radio cover comprises a front side (12) and a rear side (14) joined by a gripping portion (15). Locking pegs (21) snap-fit into corresponding openings (11) in the battery cover. A plurality of gripping surfaces (19) are provided upon the gripping portion (15) of the cover. Upon full engagement of the battery cover to the housing, the battery cover wraps around five sides of the housing, with the rear side covering a battery containment section (26) of the housing. The battery cover is easily removed from the housing by pulling the cover and the housing in opposite directions perpendicular to the direction of battery insertion.

15 Claims, 4 Drawing Sheets

1

SLIDABLE COVER FOR A BATTERY HOUSING

TECHNICAL FIELD

This invention relates in general to battery housings for battery-powered electrical products, and more particularly to a slidably-movable battery housing cover which allows for simplified cover removal.

BACKGROUND

Battery-powered electrical products generally contain a section into which a battery is inserted, the section having therein electrical contacts for contacting the battery and coupling it to electrical circuits within the product. Such battery sections have an opening through which the battery is inserted into the housing and a cover for covering the opening to prevent the battery from dislodging from the battery section. Although reference is made to a battery, it will be appreciated that the same is true of products which incorporate more than one battery, and any references to "a battery" herein are intended to imply one or more batteries.

In commonly available portable consumer products, such as two-way radios and pagers, a variety of attachment means are employed to secure the battery door to the product casing or housing. Commonly, locking mechanisms are incorporated to prevent the battery cover from unexpectedly opening and/or detaching from the product; for example, when the product is inadvertently dropped to the ground. Such locking mechanisms are often provided as a supplementary attachment where a primary attachment means, such as a latch, may not provide adequate protection when the product is dropped. Products which do not incorporate such locking mechanisms are generally more prone to opening when the product is subject to an unexpected impact, due to the loading on the battery door caused by the battery. Although supplementary locking mechanisms may ensure adequate attachment, they result in additional component and manufacturing costs. In addition, such mechanisms often add to the complexity of the product.

In light of the above, what is needed is a battery cover which may be easily attached and removed from a battery housing without the need for a secondary locking mechanism. Furthermore, the cover should be able to withstand the impact from an accidental drop without opening.

DETAILED DESCRIPTION OF THE PREFERRED EMBODIMENT

Figure 1:
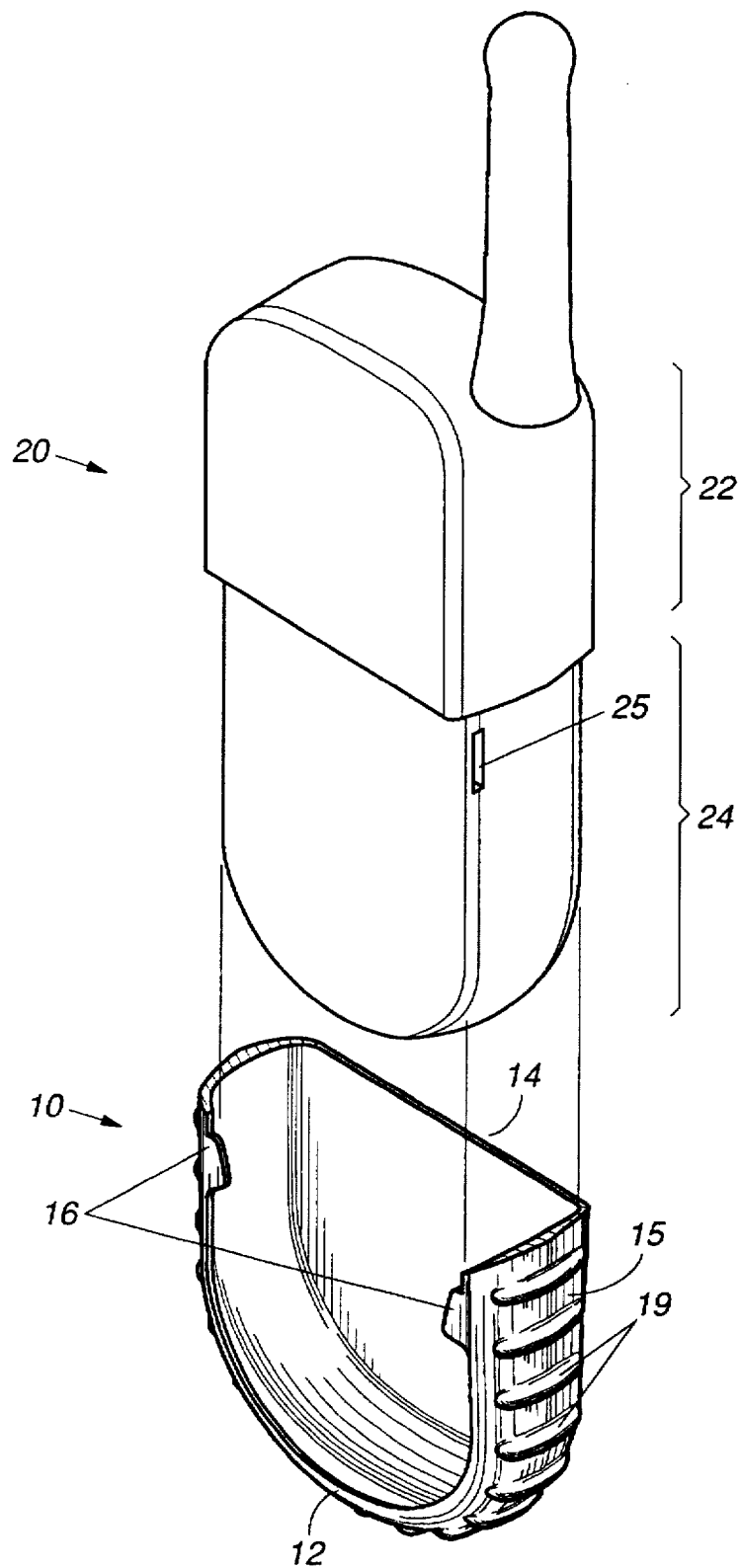
FIG. 1 is a front perspective view of a wraparound battery cover which is slidably-mountable upon a workpiece, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a front view of a molded plastic battery cover 10 slidably engagable with a radio housing 20 is shown. Although a battery cover for a two-way radio is illustrated, clearly such a battery cover could be incorporated into a multitude of battery-operated products. The battery cover has front 12 and rear 14 sides separated by a gripping portion 15. In the preferred embodiment of the instant invention the battery cover is substantially U-shaped. The front side has an integral locking means 16 which mates with a receiving means 25 formed in the housing. One skilled in the art will recognize that any of a number of known mechanical latching means could be employed. For instance, the battery cover may incorporate tabs extending inwardly from opposing sides of the U-shaped cover and interlockable with corresponding slots formed in the housing. Cover attachment is performed by sliding the cover upon a lower portion 24 of the housing until the integral locking means and the receiving means become interlocked. The cover may be subsequently disengaged from the housing by grasping the gripping portion 15 of the cover with one hand, while holding the upper portion 22 of the radio housing with the other hand, and then sliding the cover and housing in opposite directions perpendicular to the direction of battery insertion such that the locking means 16 releases from the receiving means 25. In an alternate embodiment, gripping surfaces 19 are provided on the gripping portion 15 of the battery cover to facilitate cover removal. Although laterally-disposed ridges are illustrated, any pattern which enhances the ability to grip this portion of the radio could be implemented. Furthermore, even though the inventors contemplate gripping surfaces integrally molded into the gripping portion, externally formed gripping surfaces could be disposed, e.g., adhesively, to the gripping portion. Although not shown in the drawings, a group of gripping surfaces proximate to the lowermost portion of the battery cover may be provided with a flattened surface, permitting the radio to be placed upright on a flat surface without additional support, i.e., to stand on end. For example, where laterally-disposed ridges are provided on a U-shaped cover, a group of consecutive ridges along the lower part of the cover could be flattened to form a horizontal plane.

Figure 2:
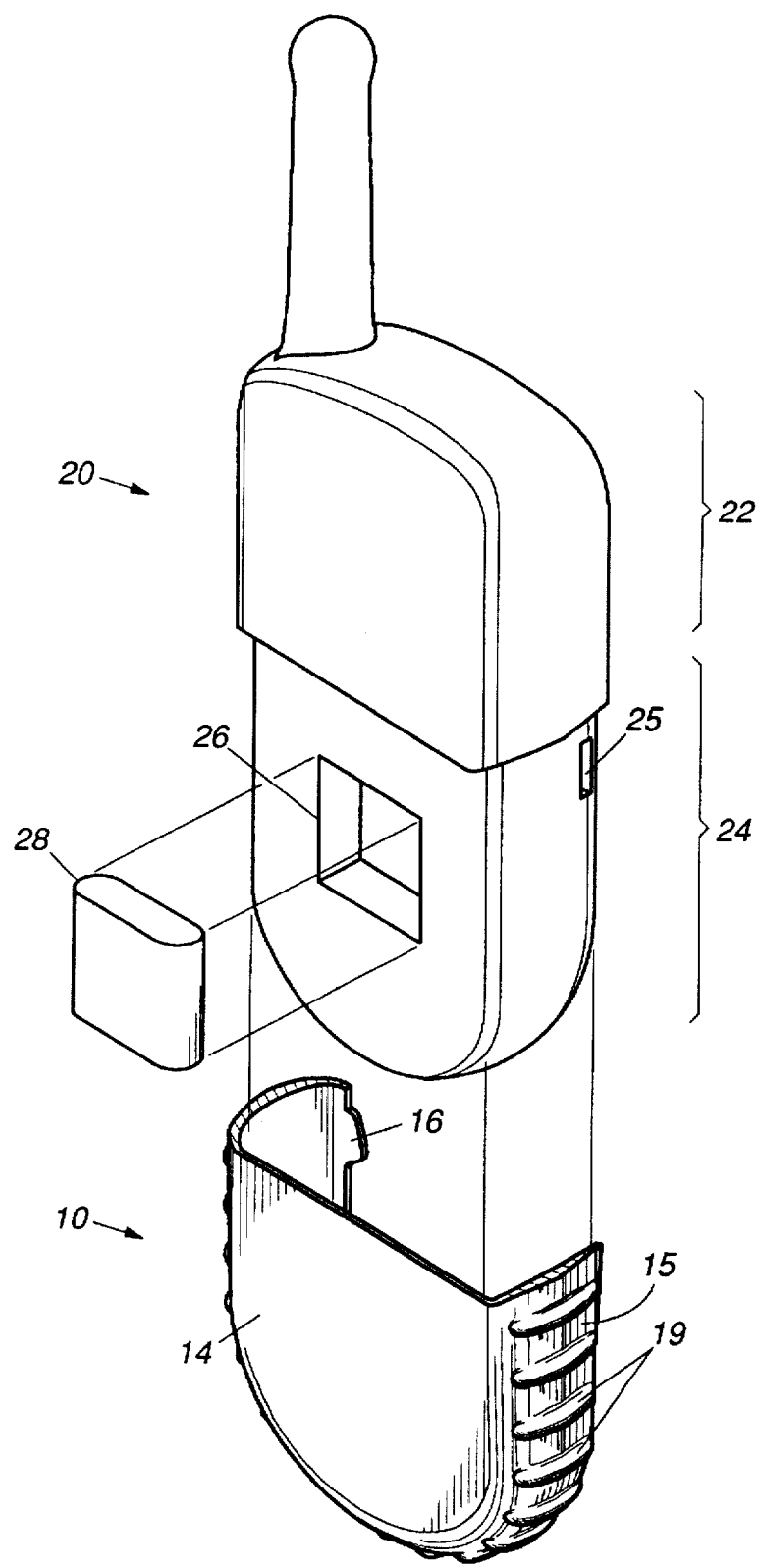
FIG. 2 is a rear perspective view of a U-shaped wraparound battery cover slidably- mountable upon a communication device in accordance with an alternate embodiment of the present invention.

Referring now to FIG. 2, a rear view of the above-described battery cover 10 and radio housing 10 is shown. The battery cover 10 slides on and off of the radio housing 20 in a direction which is perpendicular to the direction of battery 28 insertion into the battery containment section 26 of the housing. Providing a battery cover which engages the housing in a direction perpendicular to the direction of battery insertion is a critical feature of the invention; allowing for a simplified latch design without the need for a secondary locking mechanism. Typically, when a battery-operated product such as a two-way radio is dropped, the battery cover is subjected to heavy loading from the force of the battery against the cover. If the cover is removable in the same direction as battery insertion/removal, the cover is more apt to disengage from the housing. In the instant invention, the battery will not load the battery cover in the cover sliding (i.e., removal) direction, eliminating the need for a back-up cover locking mechanism.

Referring back to FIG. 1, the battery cover 10 wraps around the lower portion 24 of the radio housing 20 such that the cover contacts five sides of the radio housing. The front 12 and rear 14 sides of the cover respectively contact front and rear surfaces of the radio housing. The U-shaped gripping portion contacts a left side, right side, and bottom surface of the housing. Therefore, further mechanical support is provided to prevent the battery cover from accidentally disengaging from the housing during an inadvertant impact.

Figure 3:
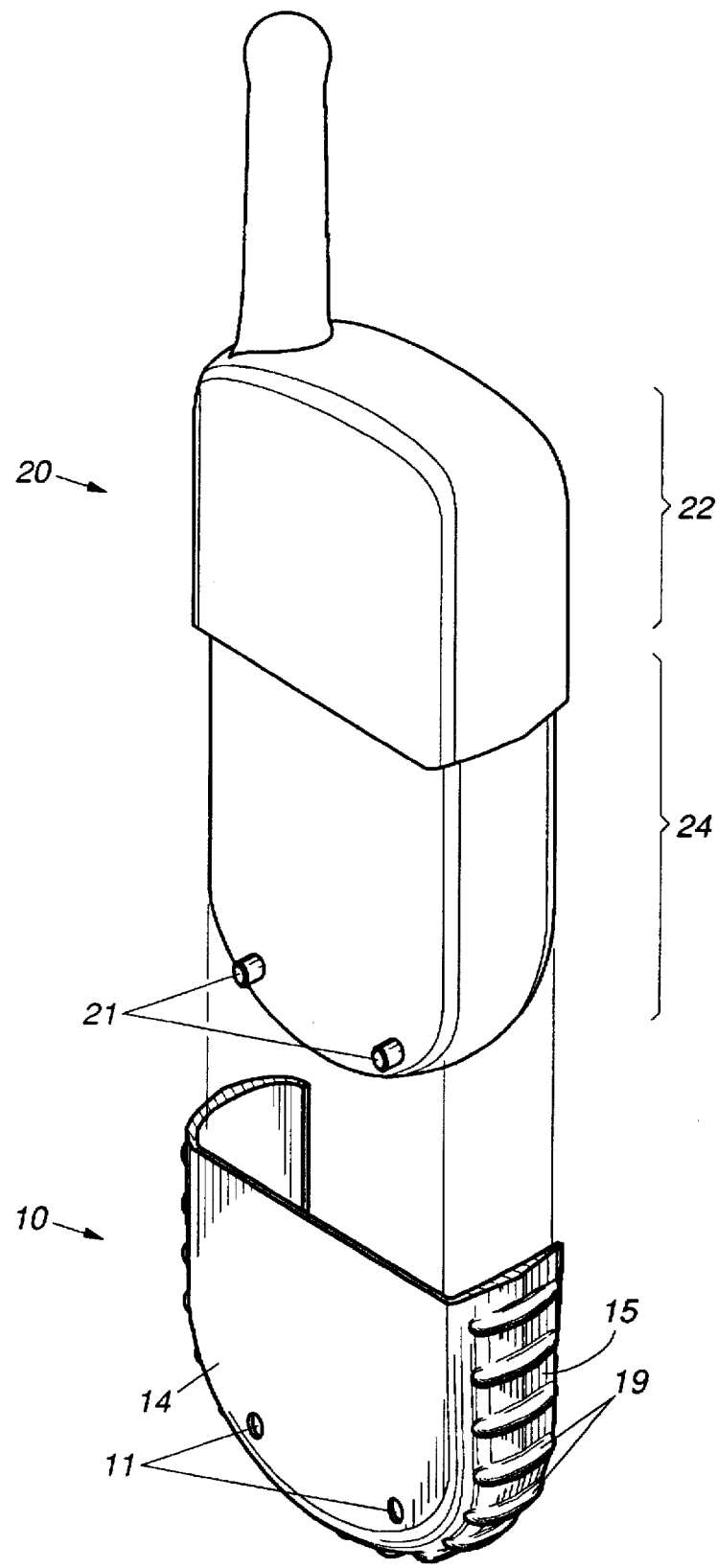
FIG. 3 is a rear perspective view of a U-shaped wraparound battery cover which snap fits to a two-way radio housing, in accordance with the preferred embodiment of the present invention.

Referring now to FIG. 3, a battery cover in accordance with the preferred embodiment of the invention is shown. A radio housing 20 has one or more integral protruding engagment members 21 extending from the rear side of the housing. The engagment members snap fit into one or more openings 11 formed in the battery cover 10, upon engagment of the cover to the housing. Any of a number of well known engagment members, e.g., pegs, pins, etc. could be provided on the housing. Friction between the engagment means and the cover openings must be sufficient to allow for a snug fit. The battery cover is attachable to a lower portion 24 of the radio housing by sliding the cover upon the housing, perpendicular to the direction of battery insertion, until the engagment members 21 snap fit together with the openings 11 in the battery cover.

Figure 4:
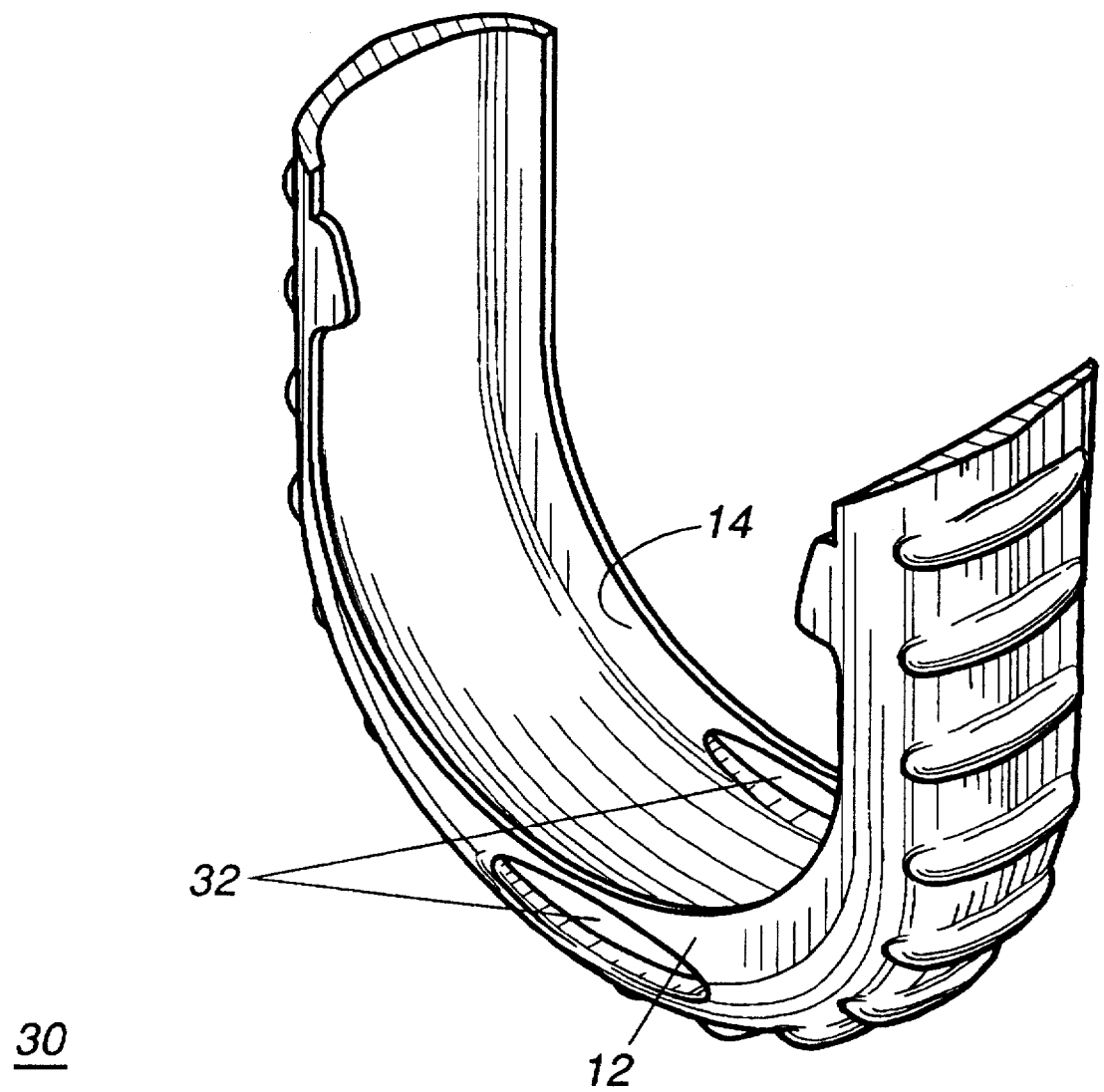
FIG. 4 is a front perspective view of a U-shaped wraparound battery cover having a pair of lanyard openings in the front and rear sides of the cover, and gripping mechanisms along a gripping portion of the cover, in accordance with an alternate embodiment of the present invention.

Referring now to FIG. 4, an alternate embodiment of the battery cover 10 has a pair of lanyard openings 32. Although elliptical-shaped openings are illustrated, virtually any opening shape could be used. When the battery cover is fully engaged to the radio housing, a corresponding lanyard opening formed in the bottom of the radio housing aligns with the openings in the cover. Generally, an attachment means such as a strap or cord may be threaded through the openings to provide a means for attaching or securing the radio to an object, e.g., an article of clothing. Additionally, the attachment means further aids in securing the battery cover to the radio housing. In the unlikely event that the interlocking means become disengaged, the attachment means would serve to keep the cover in close proximity to the housing—possibly preventing loss of the cover under certain circumstances.

The foregoing description and illustrations contained herein demonstrate the advantages of the present invention. The sliding direction of the cover—perpendicular to the direction of battery insertion—prevents batteries contained within the radio housing from loading the battery cover during an accidental drop. Thus, forces resulting from battery loading against the battery cover (which contribute substantially to disloding typical battery covers) have been negated. In addition, the wraparound design of the cover serves to further secure the cover to the housing. In combination, the aforementioned features provide sufficient aid in securing the battery cover to the housing to allow for a simpler, more efficient latch design. The present invention provides a cover which is simple to operate and eliminates the complexity and added cost associated with covers employing secondary locking mechanisms.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A wraparound battery compartment cover slidably mountable upon a workpiece, comprising:

a sliding battery cover covering a battery containment section of the workpiece and securing at least one battery therein, said battery cover having front and rear sides connected by a gripping portion, the rear side covering the battery containment section, and said battery cover wrapably engaged to the workpiece such that upon full engagement of said cover to the workpiece said cover contacts five sides of the workpiece and is in contact with the at least one battery.

2. The wraparound battery cover of claim 1, wherein said compartment battery cover is substantially U-shaped.

3. The wraparound battery cover of claim 1, wherein said battery compartment cover is slidably mountable in a direction perpendicular to the direction of battery insertion.

4. The wraparound battery cover of claim 1, wherein the workpiece comprises a two-way radio.

5. The wraparound battery cover of claim 1, further comprising a plurality of integral gripping surfaces on the gripping portion of said battery cover.

6. A substantially U-shaped wraparound battery compartment cover securing at least one battery within a battery containment section of an electronic communication device housing and maintaining physical contract therewith, said battery cover having front and rear sides connected by a gripping portion, the front side having an integral tab interlockable with a receiving slot formed in the housing, wherein said cover may be engaged to, and subsequently disengaged from, the housing by:

sliding said battery cover upon a lower portion of the housing in a direction perpendicular to the direction of battery insertion until the integral tab interlocks with the receiving slot in said housing, such that the rear side of said battery cover completely covers the battery containment section of said housing; and grasping both the gripping portion of said battery cover and an upper portion of the device housing, and applying opposite forces perpendicular to the direction of battery insertion, such that the integral tab releases from the receiving slot to expose the battery containment section.

7. A two-way radio having a wraparound battery compartment cover, comprising:

a radio housing having a battery containment section;

a substantially U-shaped battery cover slidably engaged with said radio housing securing at least one battery therein and maintaining physical contact therewith, said battery cover having a front side, a rear side and a gripping portion;

said gripping portion being substantially U-shaped and having a plurality of gripping surfaces formed thereon;

said front side consisting of a substantially U-shaped perimeter portion;

said rear side covering the battery containment section of said radio housing upon full engagement of said cover to said housing;

said front side having an integral locking means interlockable with a receiving means formed in said radio housing; and wherein said battery compartment cover wraps around five sides of said radio housing upon full engagement of said cover to said housing.

8. The two-way radio of claim 7, wherein said battery compartment cover is slidably engagable to said radio housing in a direction perpendicular to the direction of battery insertion.

9. The two-way radio of claim 7, wherein said plurality of gripping surfaces comprise laterally-disposed, uniformly spaced, integral ridges.

10. The two-way radio of claim 7, further comprising a pair of lanyard openings formed in the front and rear sides of said battery compartment cover, said openings being aligned with each other and with a corresponding lanyard opening in said radio housing.

11. A two-way radio having a wraparound battery compartment cover, comprising:

a radio housing having a battery containment section and an integral protruding engagement member extending outward parallel to the direction of battery insertion;

a substantially U-shaped battery cover slidably engaged with said radio housing securing at least one battery therein, said battery cover having a front side, a rear side and a gripping portion;

said front side consisting of a substantially U-shaped perimeter portion;

said gripping portion being substantially U-shaped and having a plurality of gripping surfaces formed thereon;

said rear side having an opening disposed therethrough for receiving the engagement member, such that said engagement member and said opening form a mechanical snap fit; and wherein upon full engagement of said cover to said radio housing, said cover wraps around five sides of said housing, such that the rear side covers the battery containment section and maintains physical contact with the at least one battery.

12. The two-way radio of claim 11, wherein said plurality of gripping surfaces comprise substantially parallel laterally-disposed ridges.

13. The two-way radio of claim 12, wherein a group of said laterally-disposed ridges formed along a lower portion of said cover each have a partially flattened surface for standing the radio on end.

14. The two-way radio of claim 11, wherein said battery compartment cover is slidably engagable to said radio housing in a direction perpendicular to the direction of battery insertion.

15. The two-way radio of claim 11, further comprising a pair of lanyard openings formed in the front and rear sides of said battery cover, said openings being aligned with each other and with a corresponding lanyard opening in said radio housing.

* * * * *